(12) United States Patent
Miki et al.

(10) Patent No.: US 11,124,450 B2
(45) Date of Patent: Sep. 21, 2021

(54) GLASS PANEL AND GLASS WINDOW

(71) Applicant: NIPPON SHEET GLASS COMPANY, LIMITED, Tokyo (JP)

(72) Inventors: Atsushi Miki, Tokyo (JP); Tetsuo Minaai, Tokyo (JP); Tatsuhiro Nakazawa, Tokyo (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 0 days.

(21) Appl. No.: 16/761,741

(22) PCT Filed: Nov. 6, 2018

(86) PCT No.: PCT/JP2018/041179
§ 371 (c)(1),
(2) Date: May 5, 2020

(87) PCT Pub. No.: WO2019/093322
PCT Pub. Date: May 16, 2019

(65) Prior Publication Data
US 2020/0262750 A1 Aug. 20, 2020

(30) Foreign Application Priority Data
Nov. 10, 2017 (JP) .............................. JP2017-217842

(51) Int. Cl.
*E06B 3/663* (2006.01)
*C03C 27/08* (2006.01)

(52) U.S. Cl.
CPC .......... *C03C 27/08* (2013.01); *E06B 3/66304* (2013.01); *E06B 3/66323* (2013.01);
(Continued)

(58) Field of Classification Search
CPC .... E06B 3/66; E06B 3/66333; E06B 3/66323; E06B 3/66304; Y02B 80/22; Y02A 30/249; C03C 27/06; C03C 27/08
See application file for complete search history.

(56) References Cited

U.S. PATENT DOCUMENTS

2003/0108692 A1   6/2003  Domi et al.
2016/0297706 A1*  10/2016 Naito .................... C03C 8/245

FOREIGN PATENT DOCUMENTS

| JP | 2002-187241 A | 6/2002 |
| WO | WO-2002/044097 A1 | 6/2002 |
| WO | 2017003659 A1 | 1/2017 |

OTHER PUBLICATIONS

International Search Report issued in Application No. PCT/JP2018/041179, dated Feb. 5, 2019.
(Continued)

*Primary Examiner* — Donald J Loney
(74) *Attorney, Agent, or Firm* — Michael Best & Friedrich LLP (57) ABSTRACT

An object is to enable suppression of thermal leakage at a peripheral portion of a pair of glass plates disposed so as to be opposed to each other with a gap interposed therebetween. A pair of glass plates 1A, 1B are disposed so as to be opposed to each other with a gap V interposed therebetween, and a periphery sealing metal material 3 is provided which joins the pair of glass plates 1A, 1B at a peripheral portion V1 thereof so as to seal the gap V in an airtight state. The periphery sealing metal material 3 interposed between opposed inner surfaces of the pair of glass plates 1A, 1B contains, in a mixed manner, a thermal insulation material 30 having lower thermal conductivity than that of the periphery sealing metal material 3.

10 Claims, 5 Drawing Sheets

(52) U.S. Cl.
CPC ......... *E06B 3/66333* (2013.01); *Y02A 30/249* (2018.01); *Y02B 80/22* (2013.01)

(56) References Cited

OTHER PUBLICATIONS

Extended Search Report issued in European Application No. 18875880.9, dated Jun. 30, 2021.
Notification of Reasons for Refusal issued in Japanese Application No. 2019-552805, dated Jun. 15, 2021, dated Jun. 22, 2021.

\* cited by examiner

GLASS PANEL AND GLASS WINDOW

TECHNICAL FIELD

The present invention relates to a glass panel including a pair of glass plates disposed so as to be opposed to each other with a gap interposed therebetween, and a periphery sealing metal material joining the pair of glass plates at a peripheral portion thereof so as to seal the gap in an airtight state, and also relates to a glass window.

BACKGROUND ART

Conventionally, it has been known that such a glass panel as described above is formed to be thermal insulation double glazing glass having an air layer as the gap or is formed to be vacuum double glazing glass in which a plurality of spacers are interposed in the gap and the gap is depressurized (see, for example, Patent Document 1).

CITATION LIST

Patent Documents

[PATENT DOCUMENT 1] Japanese Laid-Open Patent Publication No. 2002-167241

SUMMARY OF THE INVENTION

Problems to be Solved by the Invention

However, even if thermal insulation performance of the gap is ensured, there is a problem that, via a periphery sealing metal material joining both glass plates at a peripheral portion thereof, heat is transferred from the outer side of the peripheral portion of both glass plates to the inner gap side in a direction along the planes of the glass plates and in the thickness direction, and thus thermal leakage is likely to occur.

Here, as the periphery sealing metal material, low-melting-point metal called solder is used.

That is, for sealing the peripheral portion, low-melting-point metal is used because of, for example, the following reasons. The melting point thereof is lower than that of glass frit, and the low-melting-point metal can be worked at lower temperature, leading to improvement in productivity.

In addition, owing to the lower temperature, thermal stress due to thermal expansion difference can be reduced.

Further, in the case of a resin material, organic component volatilization and the like occur, and thus there is a risk that the internal pressure after sealing increases. Therefore, a solder material is preferable as a seal material.

Accordingly, an object of the present invention is to solve the above problem, and enable suppression of thermal leakage at the peripheral portion of both glass plates.

Solution to the Problems

A first aspect of the present invention is a glass panel including: a pair of glass plates disposed so as to be opposed to each other with a gap interposed therebetween; and a periphery sealing metal material joining the pair of glass plates at a peripheral portion thereof so as to seal the gap in an airtight state, wherein the periphery sealing metal material interposed between opposed inner surfaces of the pair of glass plates contains, in a mixed manner, a thermal insulation material having lower thermal conductivity than that of the periphery sealing metal material.

According to the first aspect of the present invention, the periphery sealing metal material interposed between the opposed inner surfaces of the pair of glass plates contains, in a mixed manner, the thermal insulation material having lower thermal conductivity than that of the periphery sealing metal material. Thus, regarding thermal transfer from the outer side of the peripheral portion of the pair of glass plates to the inner gap side in a direction along the planes of the glass plates and in the thickness direction of the glass plates, the thermal insulation material having lower thermal conductivity serves as a barrier and thus can suppress thermal leakage.

Therefore, the thermal insulation performance of the gap can be maintained at high level.

In a second aspect of the present invention, the thermal insulation material is composed of a metal oxide or multiple bubbles.

According to the second aspect of the present invention, the above effect based on the first aspect of the present invention is provided, and in addition, since the thermal insulation material having lower thermal conductivity is composed of a metal oxide or multiple bubbles, the thermal conductivity of the thermal insulation material becomes smaller than that of the periphery sealing metal material without use of a special material, and thus thermal leakage at the peripheral portion of both glass plates can be suppressed.

Further, in the case where the thermal insulation material is a metal oxide, the thermal conductivity thereof can be particularly reduced and moreover, an effect of reinforcing the periphery sealing metal material at the peripheral portion of both glass plates can be expected. Meanwhile, in the case where the thermal insulation material is multiple bubbles, the thermal conductivity thereof is smaller than in the case of a metal oxide, and thus thermal transfer resistance of the thermal insulation material can be further increased.

In a third aspect of the present invention, a proportion of the thermal insulation material in the periphery sealing metal material is 50% or less.

According to the third aspect of the present invention, as the proportion of the thermal insulation material in the periphery sealing metal material increases, further improvement of the thermal insulation performance of the peripheral portion, of the pair of both glass plates, which is filled with the periphery sealing metal material, can be expected, but there is a risk that airtightness of the gap cannot be ensured due to strength reduction. In contrast, if the proportion of the thermal insulation material is 50% or less, airtightness of the gap can be maintained.

In a fourth aspect of the present invention, a plurality of the thermal insulation materials are provided.

According to the fourth aspect of the present invention, since the plurality of thermal insulation materials are mixed, thermal leak to the gap can be further suppressed.

In a fifth aspect of the present invention, the thermal insulation material is mixed so as to be formed along a longitudinal direction of the peripheral portion of the glass plates.

According to the fifth aspect of the present invention, while atmospheric leak of the gap is suppressed, the thermal insulation property can be imparted.

In a sixth aspect of the present invention, a thickness of one of the pair of glass plates is 0.3 to 15 mm.

In a seventh aspect of the present invention, a spacer is interposed between the pair of glass plates.

In an eighth aspect of the present invention, a plurality of the spacers are interposed between the pair of glass plates so as to be spaced from each other by a predetermined interval, and an interval pitch of the spacers is 5 to 100 mm.

In a ninth aspect of the present invention, a depth of the sealing metal material at the peripheral portion is 1 to 10 mm.

In a tenth aspect of the present invention, thermal conductivity of the thermal insulation material is 20 W/mK or smaller.

An eleventh aspect of the present invention is a glass window, wherein the glass panel is fitted into a groove of a sash and is fixed such that the peripheral portion is held from both front and back surfaces thereof.

According to the eleventh aspect of the present invention, in the glass window wherein the glass panel is fitted into a groove of a sash and is fixed such that the peripheral portion is held from both front and back surfaces thereof, the joining strength of both glass plates is maintained at high level by the sash, whereby airtightness of the gap can be ensured over a long period.

DESCRIPTION OF EMBODIMENTS

Hereinafter, embodiments of the present invention will be described with reference to the drawings.

Figure 1:
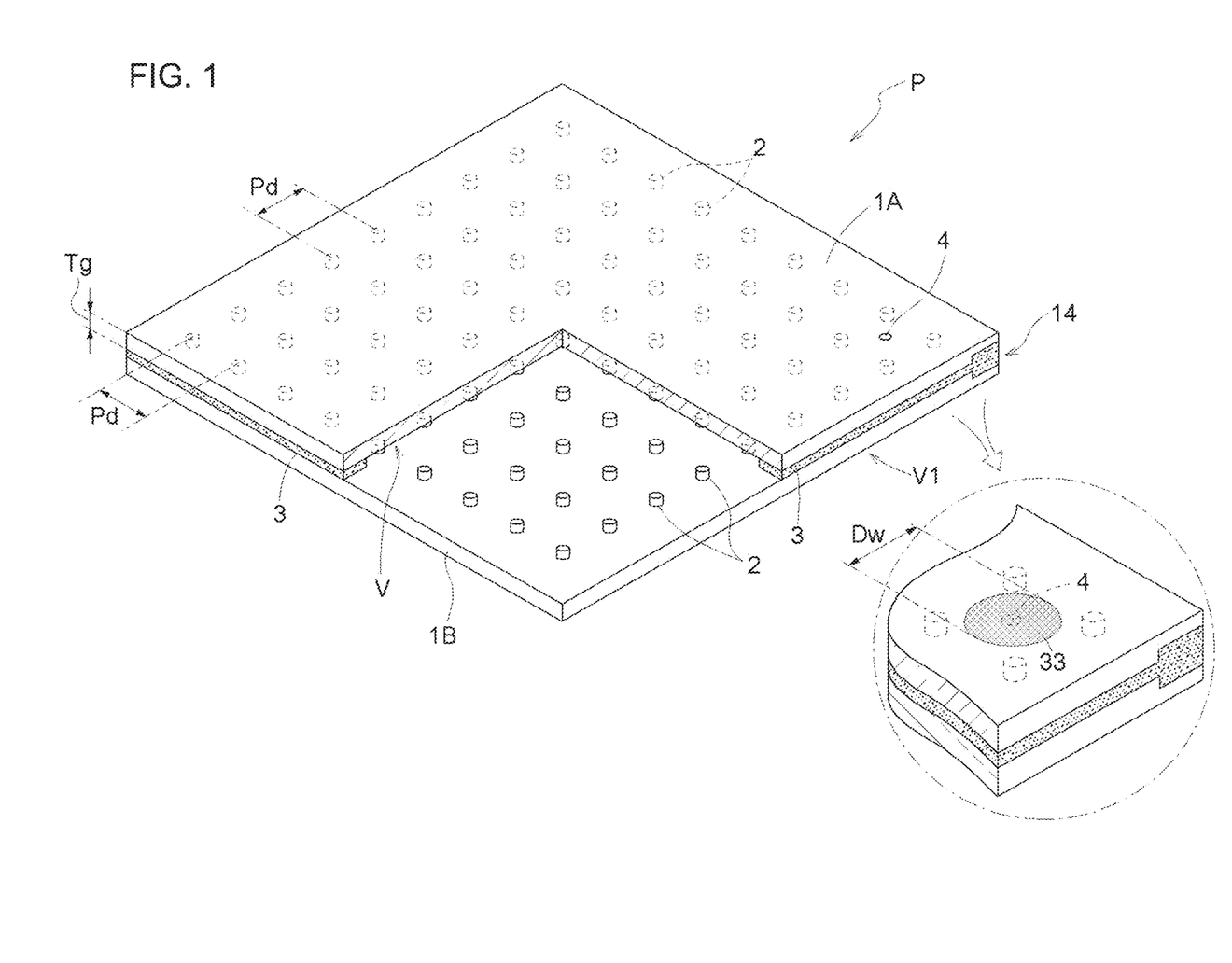
FIG. 1 is a partially cutaway perspective view of a glass panel.
Figure 2:
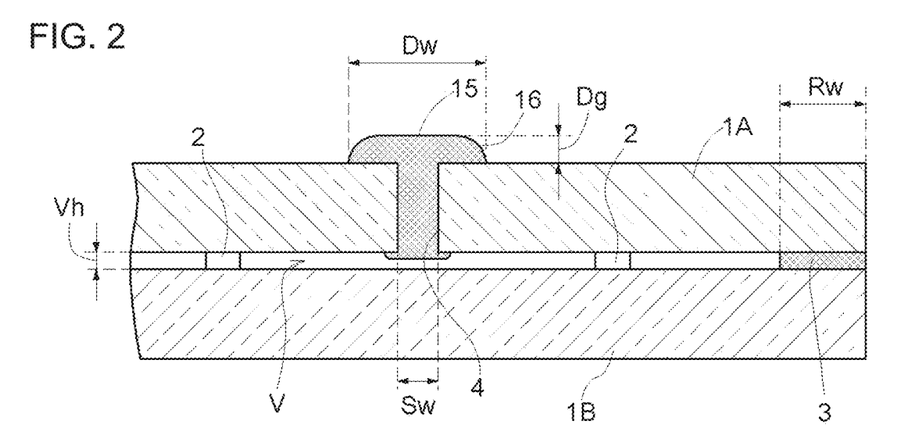
FIG. 2 is a vertical sectional view around a suction hole of the glass panel.

In FIG. 1, a glass panel P includes a pair of glass plates 1A, 1B opposed to each other, a gap V formed by a plurality of columnar spacers 2 being provided at a constant spacer pitch Pd in a matrix form between the pair of glass plates 1A, 1B, a periphery sealing metal material 3 sealing a peripheral portion V1 of the gap V, and a suction hole 4 penetrating one glass plate 1A of the pair of glass plates 1A, 1B. The suction hole 4 is sealed by a suction hole sealing metal material 15 covering the suction hole 4 including a surrounding area thereof.

In the glass panel P, the two glass plates 1A, 1B are transparent float glass, and the gap V is depressurized to 1.33 Pa ($1.0 \times 10^{-2}$ Torr) or lower. Here, the gap V is depressurized by discharging the inside air through the suction hole 4, and is sealed by the periphery sealing metal material 3 and the suction hole sealing metal material 15 in order to maintain the depressurized state of the gap V.

Each spacer 2 has a columnar shape, and has a diameter of approximately 0.3 to 1.0 mm and a height of approximately 30 μm to 1.0 mm. The spacer 2 is made from a material that does not buckle even when being subjected to compressive stress due to the atmospheric pressure applied to the glass plates 1A, 1B, e.g., a material having a compressive strength of $4.9 \times 10^8$ Pa ($5 \times 10^3$ kgf/cm$^2$) or greater, and preferably, stainless steel (SUS304) or the like.

Figure 3:
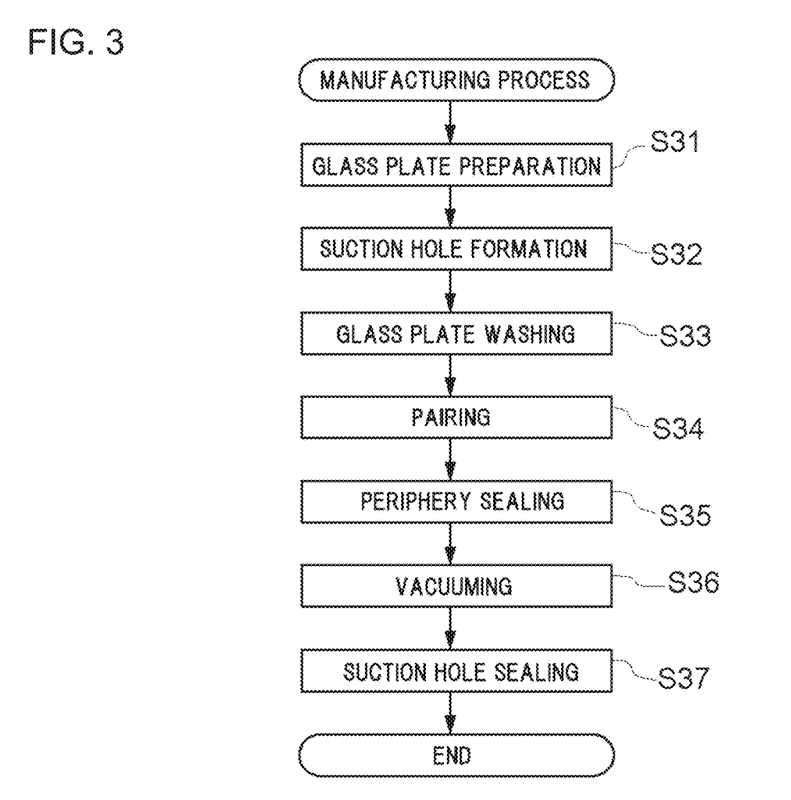
FIG. 3 is a flowchart showing a method for manufacturing the glass panel.

FIG. 3 is a flowchart showing a method for manufacturing the glass panel P shown in FIG. 1.

First, two glass raw plates (not shown) made from float glass and having a predetermined thickness are each cut in predetermined dimensions, e.g., 1200 mm×900 mm, to prepare the glass plates 1A, 1B having the same shape and the same size (step S31), and the glass plate 1A is perforated in the vicinity of one of the four corners thereof by a drill or the like, to form the suction hole 4 (step S32) (perforation step).

Next, in a space such as a clean room or a chemical clean room in which the contamination state of air can be chemically or physically controlled, the pair of glass plates 1A, 1B are cleaned using at least one of pure water brush cleaning, a liquid cleaning method, and optical cleaning (step S33) (cleaning step). In this liquid cleaning method, pure water, deionized water, or the like is used. In addition, a cleaning liquid contains an alkaline detergent or ozone water, for example. In addition, the cleaning liquid may contain a polishing agent. As the polishing agent, for example, fine particles containing cerium oxide as a main component are used.

On the glass plate 1B which has no suction hole 4 and has been cleaned, a plurality of spacers 2 are arranged at a constant spacer pitch Pd in a matrix form, and the cleaned glass plate 1A is overlaid thereon, whereby the glass plates 1A, 1B are paired (step S34).

Further, while the paired glass plates 1A, 1B are kept substantially horizontal, the peripheral portion V1 of the pair of glass plates 1A, 1B is sealed using the periphery sealing metal material 3 having a melting temperature of 250° C. or lower (step S35) (periphery sealing).

Figure 4:
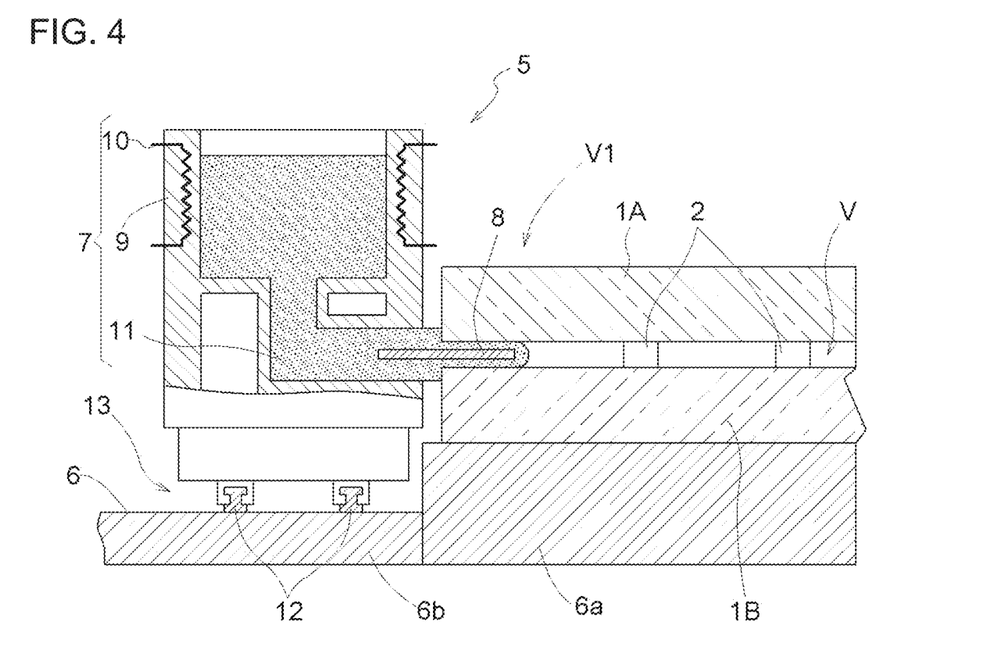
FIG. 4 is a major part vertical sectional view showing a periphery sealing step.

FIG. 4 is a view used for explaining the periphery sealing in step S35 in FIG. 3.

In FIG. 4, a metal introduction device 5 has a surface plate 6 having a high portion 6a and a low portion 6b lower than the high portion 6a so as to be formed in a step shape. The pair of glass plates 1A, 1B are retained on the high portion 6a, and a supply tower 7 for supplying solder to the pair of glass plates 1A, 1B is retained on the low portion 6b. On the low portion 6b of the stepped surface plate 6, two rail members 12 are arranged along the pair of glass plates 1A, 1B, and the supply tower 7 is placed on a movement mechanism 13 which moves on the rail members 12.

The supply tower 7 includes a crucible portion 9 which stores solder in liquid phase or solid phase and has a rectangular cross-section, an electric heater 10 which is provided inside a side wall portion of the crucible portion 9 and heats solder stored in the crucible portion 9, an introduction path 11 which has an elongated sectional shape and which communicates with a bottom portion of the crucible portion 9 and opens toward an outer side of the peripheral portion V1 of the pair of glass plates 1A, 1B, and an introduction plate 8 provided horizontally at a middle level in the introduction path 11. The introduction plate 8 extends from the introduction path 11, to be inserted into the peripheral portion V1 of the pair of glass plates 1A, 1B. Thus, solder moves into the gap V with the aid of the surface tension thereof. In addition, the weight of solder at a liquid level ΔH in the crucible portion 9 is applied to solder at the introduction plate 8 part, thereby promoting the solder to move into the peripheral portion V1 of the pair of glass plates 1A, 1B.

Figure 5:
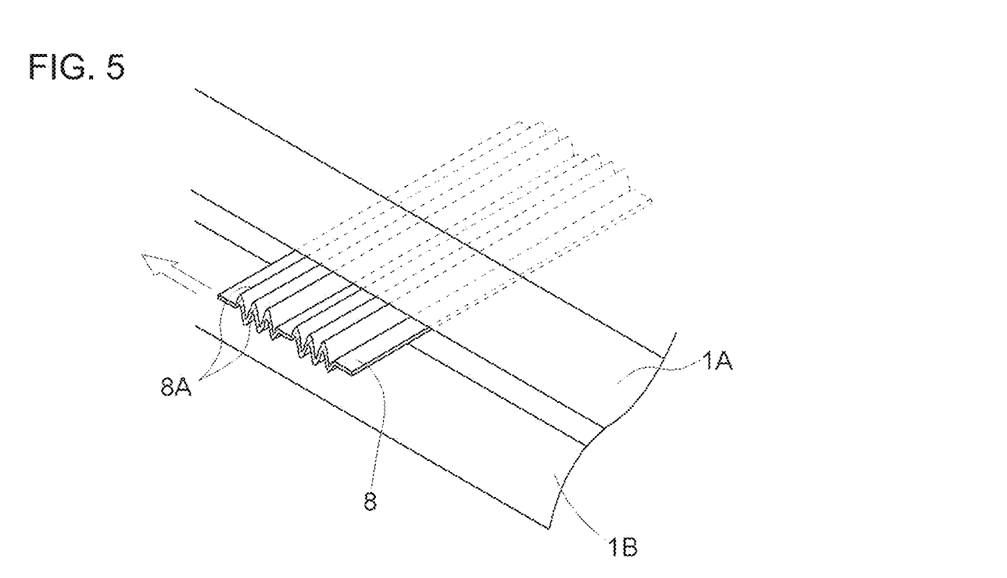
FIG. 5 illustrates an action of an introduction plate.

In addition, as shown in FIG. 5, the introduction plate 8 may have such a shape that bent portions 8A each waved up and down a plurality of times along the movement direction thereof are formed at two locations with a space therebetween (bellows shape).

That is, when the introduction plate 8 having the bent portions 8A moves, the bent portions 8A having a spring effect slightly rubs the surface of the glass plates, so that adhesion of solder to the glass surfaces is enhanced, thus providing an effect of reliably ensuring airtightness of the gap V.

In addition, the introduction plate 8 may have a bow shape providing a spring effect, or may have a planar shape having no bent portions. However, for the above reason, the introduction plate 8 having the bent portions 8A is more advantageous.

Meanwhile, the movement mechanism 13 moves at a constant speed on the rail members 12 along the peripheral portion V1 of the pair of glass plates 1A, 1B. Therefore, with the introduction plate 8 inserted into the gap V from an opened end part 14 of the pair of glass plates 1A, 1B, the periphery sealing metal material 3 moves into the entire area of the peripheral portion V1 of the pair of glass plates 1A, 1B via the introduction plate 8. Thus, the peripheral portion V1 of the gap V formed between the pair of glass plates 1A, 1B is sealed in an airtight state by the periphery sealing metal material 3.

Figure 6:
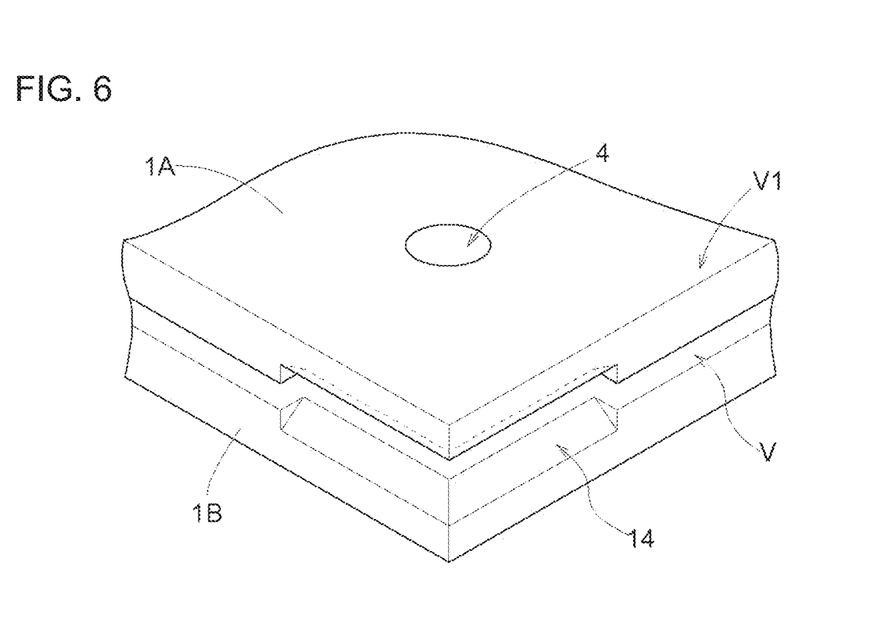
FIG. 6 is an enlarged view around the suction hole before sealing of the suction hole.

As shown in FIG. 6, the opened end part 14 is provided at a corner of the glass panel P, and is formed by chamfering gap-V-side corner portions of the pair of glass plates 1A, 1B so as to facilitate insertion of the introduction plate 8 into the gap V.

In subsequent step S36, in the vicinity of the suction hole 4, an exhaust cup is attached to the atmospheric-side main surface of the glass plate 1A so as to cover the suction hole 4, and vacuuming is performed in which gas molecules in the gap V are discharged to outside so as to reduce the pressure of the gap V to 1.33 Pa or lower through suction by a rotary pump or a turbomolecular pump (not shown) connected to the exhaust cup (step S36).

It is noted that the pump used in this step is not limited to the above-described rotary pump or turbomolecular pump, but may be any pump that can be connected to the exhaust cup and can perform suction.

Next, the suction hole sealing metal material 15 is dropped so as to overlay the suction hole 4, whereby the glass surface in the vicinity of the suction hole 4 and the suction hole sealing metal material 15 are adhered to each other to make sealing (step S37).

Thus, the gap V formed between the pair of glass plates 1A, 1B is sealed up.

It is noted that, among the above steps, the steps from cleaning of the main surfaces of the pair of glass plates 1A, 1B (step S33) to sealing by adhering the glass surface in the vicinity of the suction hole 4 and the suction hole sealing metal material 15 (step S37) are each performed in a space in which the contamination state of the air can be chemically or physically controlled.

In the present embodiment, the pair of glass plates 1A, 1B are cleaned using the liquid cleaning method. However, without limitation thereto, the pair of glass plates 1A, 1B may be cleaned using at least one of a pure water brush cleaning method, an ultrasonic cleaning method, an alkaline water cleaning method, a heating cleaning method, a vacuum (frozen) cleaning method, a UV cleaning method, an ozone cleaning method, and a plasma cleaning method. Thus, occurrence of gas molecules that can be decomposed or scattered from the main surfaces of the pair of glass plates 1A, 1B can be suppressed, and therefore the initial performance of the glass panel P can be exhibited over a long period.

In the present embodiment, as the periphery sealing metal material 3, solder having a melting temperature of 250° C. or lower, e.g., solder obtained by adding Ti to solder having a composition of 91.2Sn-8.8Zn (eutectic temperature: 198° C.) is used to seal the peripheral portion V1 of the pair of glass plates 1A, 1B. However, the periphery sealing metal material 3 (solder) is not limited thereto. The peripheral portion V1 of the pair of glass plates 1A, 1B may be sealed using a sealing material that has a melting temperature of 250° C. or lower and that is a metal material including at least one material selected from a group consisting of Sn, Cu, In, Bi, Zn, Pb, Sb, Ga, and Ag.

In addition, the periphery sealing metal material 3 may include, instead of Ti or in addition to Ti, at least one material selected from a group consisting of Al, Cr, and Si. This can improve adhesion between the periphery sealing metal material 3 and the glass component of the pair of glass plates 1A, 1B.

In the present embodiment, as the suction hole sealing metal material 15, solder having a melting temperature of 250° C. or lower, e.g., solder obtained by adding Ti to solder having a composition of 91.2Sn-8.8Zn (eutectic temperature: 198° C.) is used to seal the suction hole 4. However, the suction hole sealing metal material 15 (solder) is not limited thereto. The suction hole 4 may be sealed using a sealing material that has a melting temperature of 250° C. or lower and that is a metal material including at least one material selected from a group consisting of Sn, Cu, In, Bi, Zn, Pb, Sb, Ga, and Ag.

It is noted that, in the case of selecting Sn, it suffices that the amount thereof is 90% or higher, and in the case of Sn with Cu added thereto, the amount of Cu needs to be 0.1% or lower.

In addition, the suction hole sealing metal material 15 may include, instead of Ti or in addition to Ti, at least one material selected from a group consisting of Al, Cr, and Si.

Further, as the suction hole sealing metal material 15, solder having a component different from the periphery sealing metal material 3 may be used.

It is noted that containing Ti (titanium) in the suction hole sealing metal material 15 or the periphery sealing metal material 3 improves close adhesion to glass.

In the present embodiment, the pressure of the gap V is reduced to 1.33 Pa or lower. However, without limitation thereto, the pressure of the gap V may be reduced to reach almost a vacuum. This can further enhance thermal insulation performance of the glass panel P.

In the present embodiment, the lower limit of a thickness Tg of each of the pair of glass plates is 0.3 mm or greater. In addition, the lower limit is preferably 0.5 mm or greater. Further preferably, the lower limit is 1 mm or greater. If the thickness Tg of each of the pair of glass plates is small, the heat storage capacity of the glass itself becomes small. Therefore, at the time of periphery sealing, the amount of heat dissipation to the air per unit time increases, so that the periphery sealing metal material 3 is more readily cooled. Thus, solidification of the melted periphery sealing metal material 3 can be promoted. However, if the glass plate is thinned, rigidity of the glass plate reduces, and thus the amount of deformation of the glass plate due to the same magnitude of external force increases. Therefore, in the glass panel P, tensile stress occurring in the vicinity of a gap-side surface of the suction hole 4 increases.

The upper limit of the thickness Tg of each of the pair of glass plates is 15 mm or less. Preferably, the upper limit is 12 mm or less. Further preferably, the upper limit is 10 mm or less. In the case of using a thick glass plate, rigidity of the glass plate increases, and thus the amount of deformation of the glass plate due to the same magnitude of external force decreases. Therefore, in the glass panel P, tensile stress occurring in the vicinity of a gap-side surface of the suction hole 4 reduces, and thus long-term durability is improved. On the other hand, if the glass plate thickness Tg increases, the amount of the suction hole sealing metal material 15 flowing into the suction hole 4 at the time of sealing the suction hole is decreased. Thus, protrusion of the suction hole sealing metal material 15 on the gap side is reduced, so that it becomes difficult to relax tensile stress occurring in the vicinity of the gap-side surface of the suction hole 4.

The pair of glass plates 1A, 1B are float glass, but are not limited thereto. In accordance with the intended usage as described above, various types of glass such as figured glass, frosted glass having a light diffusing function due to surface treatment, wire mesh glass, a wire glass plate, tempered glass, double-tempered glass, low-reflection glass, high-transmission glass plate, a ceramic glass plate, special glass having a function of absorbing heat rays or ultraviolet rays, or a combination thereof, can be appropriately selected and used as the pair of glass plates 1A, 1B.

Further, also regarding the composition of the pair of glass plates 1A, 1B, soda silicate glass, soda-lime glass, borosilicate glass, aluminosilicate glass, various crystallized glasses, or the like can be used.

In the present embodiment, the opened end part 14 is formed by chamfering gap-V-side corner portions of the glass plates 1A, 1B in a planar shape. However, without limitation thereto, any shape that allows the introduction plate 8 to be easily inserted, e.g., curved-surface chamfers, can be appropriately selected and provided to the glass plates 1A, 1B.

In the present embodiment, the spacer pitch Pd is 5 to 100 mm, preferably 5 to 80 mm, and further preferably 5 to 60 mm.

In addition, the spacer 2 is formed from stainless steel, but is not limited thereto. The spacer 2 may be formed from a high-rigidity material, e.g., Inconel, metal such as iron, aluminum, tungsten, nickel, chromium, or titanium, an alloy such as carbon steel, chrome steel, nickel steel, nickel-chrome steel, manganese steel, chrome manganese steel, chrome molybdenum steel, silicon steel, brass, solder, or duralumin, ceramic, glass, etc. In addition, the shape of the spacer 2 is not limited to a columnar shape, but may be various shapes such as an angled shape or a spherical shape.

In the present embodiment, a gap height Vh is 30 μm to 1 mm. It is noted that the gap height Vh is substantially the same as the height of the spacer 2.

It is noted that, in the gap V, an evaporable getter may be used for adsorbing gas molecules in the gap V, a non-evaporable getter which adsorbs and removes gas molecules by being heated and activated may be used, or a non-evaporable getter and an evaporable getter may be used in combination. In addition, in the gap V, getter materials (adsorbents) and adsorbent storage holes may be provided at two or more locations.

In the present embodiment, the periphery sealing metal material 3 is formed using the metal introduction device 5, but another method may be used. The periphery sealing metal material 3 may be formed using at least one joining method of anodic bonding, ultrasonic welding, multistage welding, laser welding, and pressure bonding. Thus, adhesion of the periphery sealing metal material 3 to the pair of glass plates 1A, 1B can be improved.

In addition, a width Rw (depth in the peripheral portion V1) of the periphery sealing metal material 3 as seen in the thickness direction with respect to the plane of the glass panel P is not less than 1 mm and not greater than 10 mm. If the width Rw is less than 1 mm, it is difficult to keep the sealing of the gap V of the glass panel P. In addition, if the width Rw is greater than 10 mm, the amount of heat exchange occurring through the periphery metal sealing material 3 becomes excessive. Further preferably, the width Rw is not less than 1 mm and not greater than 5 mm. In this case, it is possible to keep the sealing of the gap V of the glass panel P and in addition, reduce the amount of heat exchange.

In the present embodiment, a part of the suction hole sealing metal material 15 that protrudes from the atmospheric-side surface of the glass plate 1A after sealing is referred to as a protruding portion 16. A protruding portion diameter Dw (which is the same as the width of a contact portion 33 in contact with the glass plate 1A in FIG. 1) of the protruding portion 16 is 2 to 30 mm. Further preferably, the protruding portion diameter Dw is 2 to 15 mm. It is noted that, in any case, the protruding portion diameter Dw is greater than a suction hole diameter Sw.

In addition, a protruding portion thickness Dg of the protruding portion 16 is 0.1 to 20 mm. Preferably, the protruding portion thickness Dg is 0.1 to 10 mm.

In the present embodiment, the suction hole diameter Sw is 2 to 10 mm. Preferably, the suction hole diameter Sw is 2 to 5 mm. In the case of tempered glass, it is desirable that the suction hole diameter Sw is greater than the glass thickness and is not greater than 10 mm. This is for passing air through the suction hole 4 at the time of air-quenching tempering.

In addition, at least a lower edge portion of the suction hole 4 may be formed in a curved-surface shape or may be chamfered (a minute surface may be provided at the edge portion).

Figure 7:
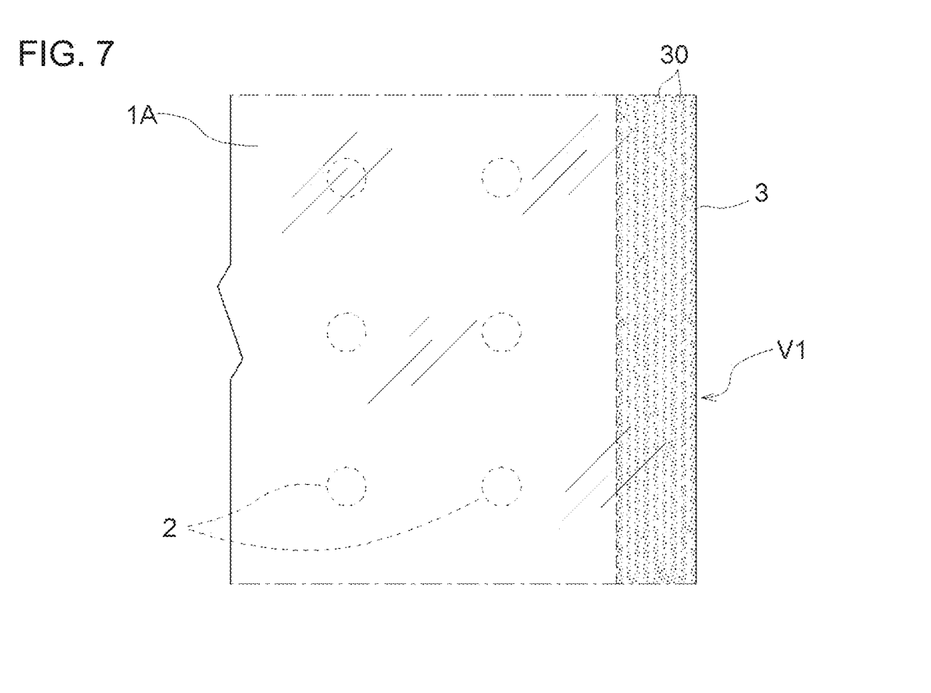
FIG. 7 is a partial top view of the glass panel.
Figure 8:
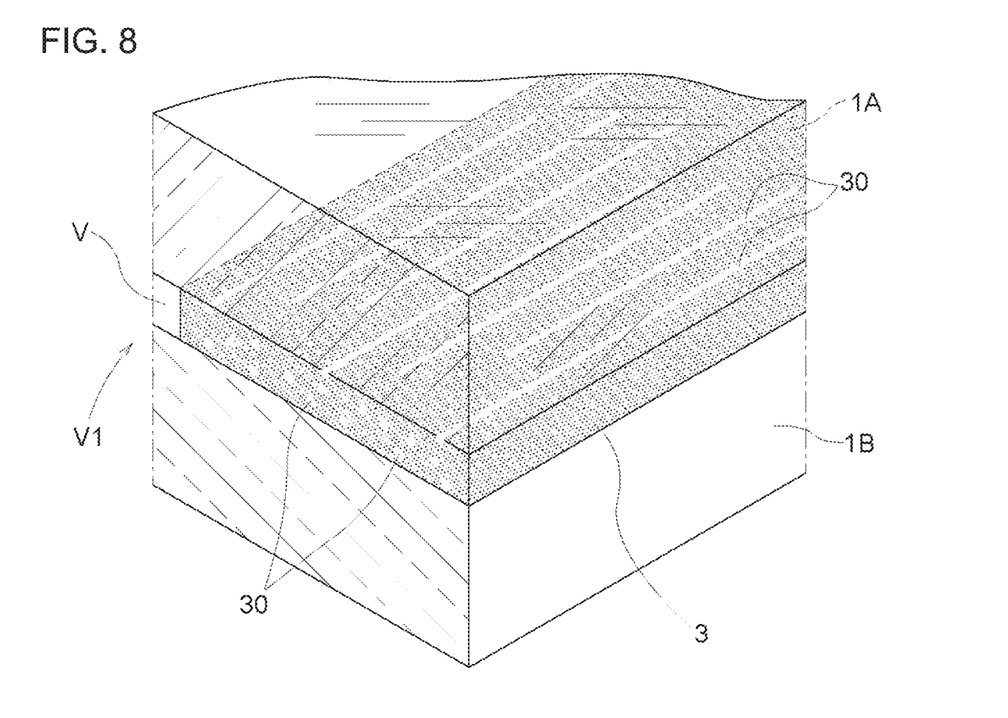
FIG. 8 is a vertical sectional perspective view of a peripheral portion of the glass panel.
Figure 9:
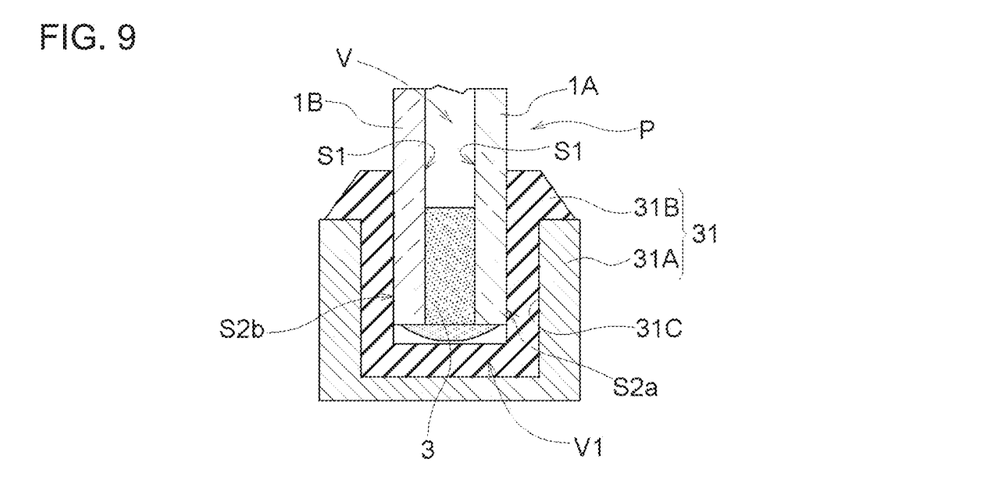
FIG. 9 is a vertical sectional view in a state in which the glass panel is fitted into a sash.

As shown in FIGS. 7 to 9, along with movement of the introduction plate 8 and also owing to an action of rubbing against the glass surface by the introduction plate 8, a filamentary thermal insulation material 30 made of a material having lower thermal conductivity than that of the periphery sealing metal material 3 is provided in the periphery sealing metal material 3 and at the contact surface between the periphery sealing metal material 3 and each of opposed inner surfaces S1 of both glass plates 1A, 1B. The filamentary thermal insulation material 30 is oriented along the longitudinal direction of the peripheral portion V1 of the glass plates 1A, 1B.

In the case where the thermal insulation material 30 is an oxide of melted metal, not only thermal transfer resistance can be increased but also an effect of reinforcing the periphery sealing metal material 3 at the peripheral portion V1 of both glass plates 1A, 1B can be expected. Further, as described above, the thermal insulation material 30 is formed in a filamentary shape and also is oriented along the longitudinal direction of the peripheral portion V1 of the glass plates 1A, 1B. Therefore, movement of thermal energy to be transferred from the outer side of the glass panel P into the gap V is blocked by the filamentary thermal insulation material 30 serving as a barrier, and as a result, thermal leakage can be reduced.

The thermal conductivity of air is 0.024 (W/mK), whereas the thermal conductivity of solder as the periphery sealing metal material is 20 to 70 (W/mK), and the thermal conductivity of a typical metal oxide (TiO$_2$: approximately 2 to 4, SiO$_2$: approximately 1, ZnO (alumina): approximately 30) as the thermal insulation material 30 is 1 to 30 (W/mK).

It is noted that, if a larger amount of the thermal insulation material 30 is mixed in the periphery sealing metal material 3, the thermal leakage to the gap V is more reduced, but airtightness is lowered. Therefore, it is desirable that, particularly at the contact surfaces with the glass plates 1A, 1B, the amount of the thermal insulation material 30 is 50% or less.

As shown in FIG. 9, the glass panel P is fitted into a groove 31C of a sash frame 31A forming a sash 31, with a glazing channel 31B (which is also called "gla-chan") interposed therebetween, and is fixed by the sash 31 such that the peripheral portion V1 is held between a front-side outer surface (front surface) S2a and a back-side outer surface (back surface) S2b of the glass panel P. Thus, it is possible to form a glass window in which the joining strength of both glass plates 1A, 1B is maintained at high level and airtightness of the gap can be ensured over a long period.

OTHER EMBODIMENTS

Other embodiments will be described below.

In other embodiments below, the same members as those in the above embodiment are denoted by the same reference characters.

<1> As long as the thermal insulation material 30 is a material having lower thermal conductivity than that of the periphery sealing metal material 3, the thermal insulation material 30 may be a material other than a metal oxide, or multiple bubbles, or may be a mixture thereof or only one kind thereof. In the case of adopting multiple bubbles, the thermal conductivity is reduced as compared to the case of a metal oxide, and thus thermal transfer resistance of the thermal insulation material 30 can be further increased.

<2> In the case where the thermal insulation material 30 is multiple bubbles, the bubbles may be present in a dispersed state in the periphery sealing metal material 3, or may be arranged along the longitudinal direction of the peripheral portion V1 of the glass plates 1A, 1B.

<3> In the sealed part by the periphery sealing metal material 3 at the peripheral portion V1 of the pair of glass plates 1A, 1B, it is desirable that, also for maintaining airtightness of the gap V, metal oxides or multiple bubbles forming the thermal insulation material 30 are not contiguous from the gap V to the outer side of the peripheral portion V1 of the pair of glass plates 1A, 1B and are mixed in the periphery sealing metal material 3.

<4> The plate thicknesses of the glass plates 1A, 1B are not limited to those shown in the above embodiment, and may be different from each other.

It is noted that, although the reference characters have been given for convenience of matching with the drawings as described above, such reference characters are not intended to limit the present invention to the configurations shown in the accompanying drawings. In addition, it should be naturally understood that various embodiments can be made without departing from the scope of the present invention.

INDUSTRIAL APPLICABILITY

The present invention is applicable as a glass panel having high thermal insulation performance. For example, the present invention is applicable as a thermal insulation glass panel required to have long-term durability for a door, a wall part, etc., of a building or a vehicle (window glass of an automobile, a rail road vehicle, a vessel, etc.) or of various devices such as a refrigerator and a heat insulating device.

DESCRIPTION OF THE REFERENCE CHARACTERS 1A, 1B glass plate
2 spacer (pillar)
3 periphery sealing metal material (solder)
4 suction hole
4e edge
5 metal introduction device
6 surface plate
6a high portion
6b low portion
7 supply tower
8 introduction plate
8A bent portion
9 crucible portion
10 electric heater
11 introduction path
12 rail member
13 movement mechanism
14 opened end part
15 suction hole sealing metal material (solder)
16 protruding portion
30 thermal insulation material
31 sash
31A sash frame
31B glazing channel
31C groove
S1 inner surface
S2a front surface
S2b back surface
V gap
V1 peripheral portion
P glass panel
Dw protruding portion diameter
Dg protruding portion thickness
Tg glass plate thickness
Pd spacer pitch (interval)
Rw periphery sealing metal width
Sw suction hole diameter

The invention claimed is:

1. A glass panel comprising:
   a pair of glass plates disposed so as to be opposed to each other with a gap interposed therebetween; and
   a periphery sealing metal material joining the pair of glass plates at a peripheral portion thereof so as to seal the gap in an airtight state, wherein
   the periphery sealing metal material interposed between opposed inner surfaces of the pair of glass plates contains, in a mixed manner, a thermal insulation material having lower thermal conductivity than that of the periphery sealing metal material, and
   the thermal insulation material has a filamentary shape elongated along an extending direction of the periphery sealing metal material.

2. The glass panel according to claim 1, wherein the thermal insulation material is composed of a metal oxide or multiple bubbles.

3. The glass panel according to claim 1, wherein a proportion of the thermal insulation material in the periphery sealing metal material is 50% or less.

4. The glass panel according to claim 1, wherein
a plurality of the thermal insulation materials are provided.
5. The glass panel according to claim 1, wherein
a thickness of one of the pair of glass plates is 0.3 to 15 mm.
6. The glass panel according to claim 1, wherein
a spacer is interposed between the pair of glass plates.
7. The glass panel according to claim 6, wherein
a plurality of the spacers are interposed between the pair of glass plates so as to be spaced from each other by a predetermined interval, and
an interval pitch of the spacers is 5 to 100 mm.
8. The glass panel according to claim 1, wherein
a depth of the sealing metal material at the peripheral portion is 1 to 10 mm.
9. The glass panel according to claim 1, wherein
thermal conductivity of the thermal insulation material is 20 W/mK or smaller.
10. A glass window, wherein
the glass panel according to claim 1 is fitted into a groove of a sash and is fixed such that the peripheral portion is held from both front and back surfaces thereof.

* * * * *